United States Patent [19]
Cushman

[11] Patent Number: 4,741,265
[45] Date of Patent: May 3, 1988

[54] PINEAPPLE CORER AND PEELER

[75] Inventor: Richard Cushman, Livonia, Mich.

[73] Assignee: R. Cushman & Associates, Inc., Livonia, Mich.

[21] Appl. No.: 77,743

[22] Filed: Jul. 27, 1987

[51] Int. Cl.⁴ .................... A23N 4/20; A23N 7/00; A23N 7/08

[52] U.S. Cl. ........................ 99/542; 99/544

[58] Field of Search ............ 99/539, 540–545, 99/547, 564, 588, 589, 590, 593; 426/482, 483

[56] References Cited

U.S. PATENT DOCUMENTS

| | | | |
|---|---|---|---|
| 319,332 | 6/1885 | Scott | 99/545 |
| 2,693,210 | 11/1954 | Gustafson | 99/545 |
| 3,568,743 | 3/1971 | Dulieu | 99/544 |
| 4,606,263 | 8/1986 | Ross et al. | 99/542 |

Primary Examiner—Timothy F. Simone
Attorney, Agent, or Firm—Cullen, Sloman, Cantor, Grauer, Scott, & Rutherford

[57] ABSTRACT

A pineapple corer and peeler comprises a power rotated head stock and an adjustable tail stock upon a framework to axially support and rotate a pineapple. A rotatable core cutting tube with sharpened circular edges advances axially through the head stock to longitudinally sever the pineapple core and a peeler blade upon a power rotated lead screw feeds along and spirally peels the pineapple during rotation.

28 Claims, 4 Drawing Sheets

PINEAPPLE CORER AND PEELER

FIELD OF THE INVENTION

The present invention relates to power mechanism for coring and peeling a pineapple and particularly to the power rotation of a pineapple upon its long axis, axially severing the core and spirally peeling the pineapple.

BACKGROUND OF THE INVENTION

Heretofore it is common practice after the manual twisting and removal of the green growth at one end of a fresh pineapple of transversely cutting off the ends and thereafter with a sharp knife cutting longitudinally outer surface strips of the pineapple and thereafter transversely cutting the pineapple with its peeling removed into a series of transverse circular slices. It is common practice to thereafter one or two slices at a time, make a pair of spaced and right angular related cuts across the respective slices to sever and isolate the central core portion, and successively trimming the remaining portions of the slices into smaller pieces or for removing remaining skin portions of the pineapple.

More recently there has been used in markets a manual machine which axially grips the pineapple in an upright position and wherein a pair of opposed concentric sharpened cylindrical tubes are brought towards each other longitudinally removing the outer scale portions of the pineapple. Some of these machines may have a coring tool which simultaneously cuts out the core.

The disadvantage of the earlier manual cutting of a pineapple is the time consumption and the possibility of injury in the use of a sharp knife for this purpose, and the nonuniformity of the coring and peeling.

The disadvantage of the presently known peeling machine is that it removes too much of the outer scale of the pineapple leaving too little of the edible portion, and is difficult to accommodate pineapples of different diameter and is still time consuming.

SUMMARY OF THE INVENTION

An important feature of the present invention is to provide a power mechanism for coring and peeling a pineapple and particularly to the power rotation of a pineapple upon its longitudinal axis, severing the core upon said axis and successively spirally peeling the pineapple from one end to the other.

Another feature is to provide a power rotated head stock and an adjustable tail stock upon a framework to axially support and rotate a pineapple together with a rotatable core cutting tube with a sharp circular edge which advances axially through the head stock to longitudinally sever a pineapple core and wherein a peeler blade upon a power rotated lead screw is biased against, feeds along and spirally peels the pineapple during rotation thereof.

Still another feature is to provide a power rotated head stock assembly journaled upon a framework upon a first longitudinal axis adapted to axially grip and rotatably support one end of a pineapple. A tail stock assembly is aligned with and spaced from the head stock and is longitudinally adjustable to axially engage and rotatably journal the other end of the pineapple.

Another feature is to provide within the head stock assembly a power rotatable core cutting tube with a sharpened circular end which is drivingly connected to the head stock and wherein threaded means are employed between the head stock and core cutting tube for effecting a longitudinal movement of the core cutting tube relative to the head stock assembly along its axis and along the length of the pineapple for severing the core therefrom.

As another feature the head stock assembly includes an elongated head stock sleeve which is journaled upon the framework and includes a head stock on one end having an axial bore and wherein a pinion gear is secured upon the head stock sleeve and adapted for meshing with a power rotated drive gear and wherein the core cutting tube extends along the length of the head stock sleeve and is connected thereto.

Another feature is to provide for the pineapple corer and peeler a threaded mechanism which includes an axial feed screw within and along the length of the sleeve and head stock upon a first axis at one end adjustably connected to the framework and wherein a feed nut is secured within the core cutting tube, is slidably mounted upon and rotatively driven by the sleeve and is in mesh with the feed screw so that rotation of the head stock sleeve and core cutting tube and nut relative to the feed screw effects longitudinal feeding of the core cutting tube axially outward of the head stock for severing the pineapple core.

Another feature of the present invention is to provide for the power rotated head stock, a power rotated drive gear adapted for connection selectively to a hand crank or to the drive shaft of an electric motor.

Still another feature is to provide for the head stock a grip ring removably secured over the end of the head stock and which includes a plurality of right angularly related tapered grips adapted for interlocking projection into one end of a pineapple.

Another feature includes a cover which overlies the head stock sleeve which is rotatably journaled thereon upon a first axis and wherein a drive shaft is journaled upon the cover upon a second axis parallel to the first axis and is adapted for connection to a rotative drive and wherein a drive gear on the drive shaft is in mesh with a pinion gear on the head stock sleeve.

As a further feature the present pineapple corer and peeler upon rotation of the drive shaft in one direction rotates the head stock sleeve, head stock and core cutting tube in one direction with threaded means simultaneously feeding the core cutting tube longitudinally of the head stock and wherein rotation of the drive shaft in the opposite direction rotates the head stock sleeve, head stock and core cutting tube in the opposite direction with the threaded means simultaneously retracting the core cutting tube to its initial position, with the severed core engaging the threaded means and remaining within the pineapple.

As an important feature the present pineapple corer and peeler includes a power rotatable lead screw journaled upon the framework upon a third axis mounting a nonrotatable feed nut supporting a cutter arm extending transversely of the third axis and mounting an inclined peeler blade adapted to operatively engage the surface of a pineapple rotatably mounted between the head stock and tail stock and wherein spring means is employed for biasing the cutting arm and blade against the pineapple.

As a still further feature a driven gear is secured upon the lead screw and in mesh with the power rotated drive gear and wherein the drive gear on the drive shafts is in mesh with the pinion gear on the head stock sleeve.

Another feature is to provide a tail stock assembly which includes a pair of laterally spaced apertured bosses upon the framework upon opposite sides of the first axis for the head stock with a pair of parallel guide rods at their one ends secured within the bosses and overlying the platform. A tail stock having a bore is slidably mounted upon the guide rods and includes an axial tail stock grip journaled within and mounted upon the tail stock adapted to compressively and axially engage and journal one end of a pineapple.

As a further feature adjustable stop means are interposed between the tail stock and the framework for axially and adjustably retaining the tail stock into operative engagement with a pineapple for selectively supporting pineapples of different lengths. Alternatively, as an equivalent, a lead screw may be used to axially adjust the tail stock.

These and other objects and features will be seen from the following specification and claims in conjuction with the appended drawings.

THE DRAWINGS

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 3:
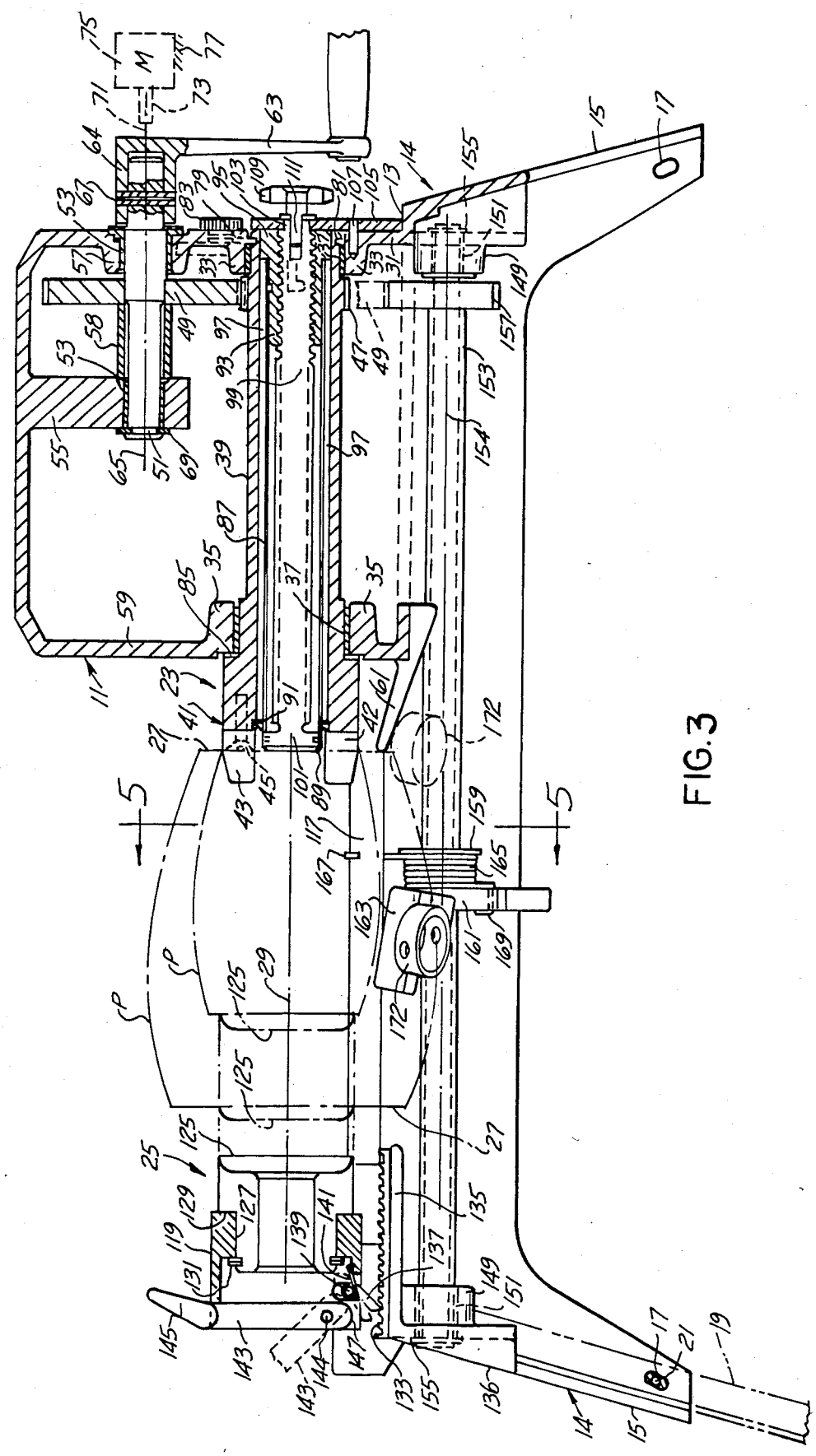
FIG. 3 is a longitudinal section taken in the direction of arrows 3—3 of FIG. 4 with one of the legs fragmentarily shown and with a portion of the housing oriented 90° from the position in FIG. 4.

Referring to the drawings, the pineapple corer and peeler is generally designated at 11 in FIG. 3 and includes a horizontal platform 13 upon a framework 14 which includes opposed pairs of diverging inclined end supports 15 of transverse right angular cross-section and with longitudinal apertures 17 therein. Extension legs 19 of similar cross-section nest within the respective end supports and are secured thereto by fasteners 21.

The power rotated head stock assembly 23 is mounted above platform 13 upon a first longitudinal axis 29 and is adapted to axially grip and rotatably support one end of the pineapple P, shown in dash lines, whose ends are cut off as at 27. A tail stock assembly 25 is aligned with and spaced from the head stock assembly 23, is mounted upon framework 14, is longitudinally adjustable upon axis 29 and adapted to axially engage and rotatably journal the other end of pineapple P.

End plate 31 forms a part of framework 14 and terminates in the apertured boss 33. The corresponding apertured boss 35 is formed upon said framework to receive the respective bushings 37 through which is rotatively projected the elongated head stock sleeve 39 mounting upon one end head stock 41.

Figure 4:
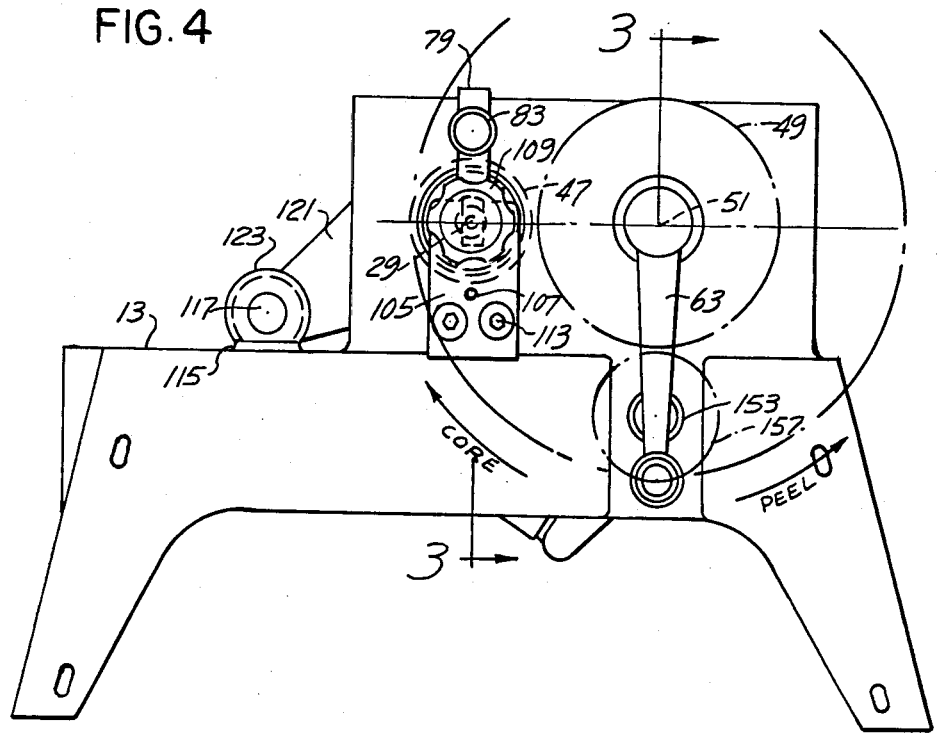
FIG. 4 is a right end elevational view of the pineapple corer and peeler shown in FIG. 1.
Figure 5:
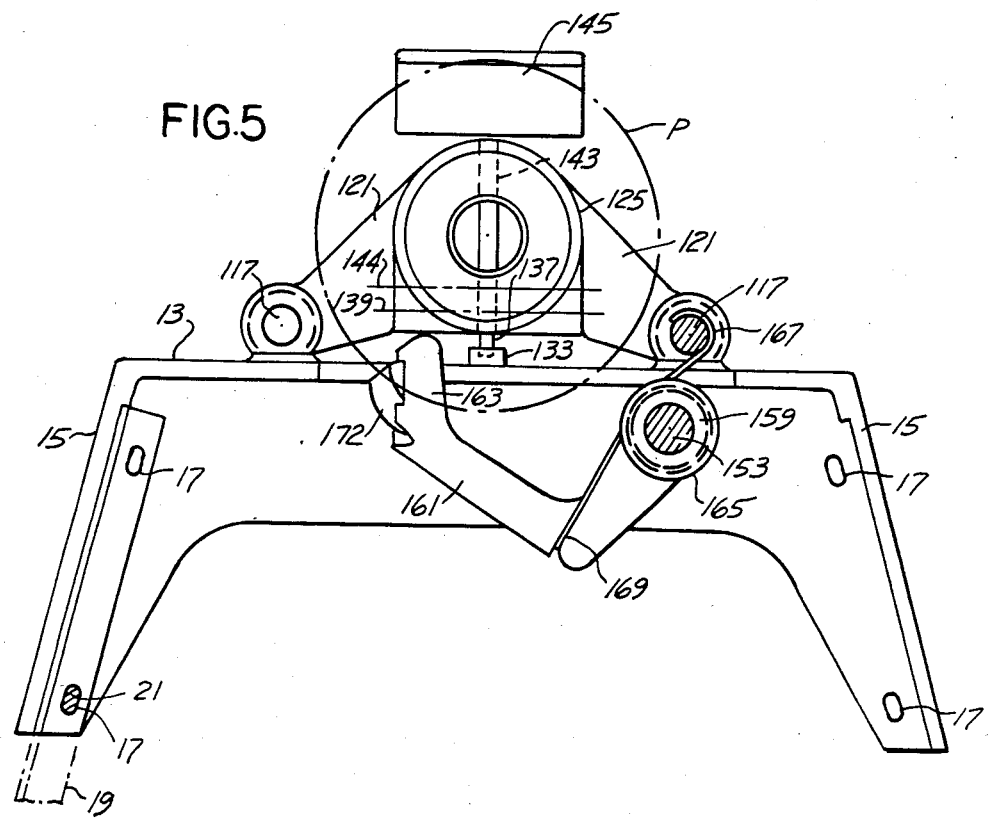
FIG. 5 is a partially sectioned view taken in the direction of arrows 5—5 of FIG. 3.

Grip ring 42 has upon its outer surface a plurality of pairs of tapered or sharpened right angularly related head drive blades 43 adapted for securing projection axially into one end of pineapple P. The grip ring 42 is removably mounted axially over the end of head stock 41 and secured thereto by fasteners 45. Pinion gear 47 is mounted upon head stock sleeve or spindle 39 adjacent one end thereof, FIG. 3, and is in mesh with drive gear 49. Gear 49 is secured upon drive shaft 51 journaled within nylon bushings 53 respectively within boss 55 and the corresponding hub 57 on housing 59 with a spacer 58 interposed between said gear and boss 55. In FIG. 3, shaft 51, for clarity of illustration, is shown displaced 90° from the position shown in FIG. 4.

The hollow cover 59 is of cast aluminum and is a part of stand 15. Said cover 59 includes arcuate bosses 33, 35 which support bushings 37 which journal head stock sleeve 39. Drive shaft 51 is arranged upon a second axis 65 parallel to first axis 29 and is adapted for connection to a power driven means.

In the illustrative embodiment shown in FIG. 3, the power driven means includes a hand crank 63 having an apertured hub 64 which receives a projecting end portion of drive shaft 51 and is secured thereto by the transverse roll pin 67. Snap ring 69 is positioned within an annular groove within shaft 51 for retaining said shaft against relative outward movement relative to cover 59.

As an alternative power means there is schematically shown in FIG. 3 an electric reversible motor 75 upon a support 77 including a drive shaft 73 coupled axially at 71 to drive shaft 51.

Radially extending locking tab 79, FIG. 3, is guidably positioned within cover 59 and in the position shown in FIG. 3 retainingly nests within the annular groove 81 within head stock sleeve 39. Thumb screw 83 extends through tab plate 79 and is threaded into a portion of cover 59 for securing the locking tab interlocked with sleeve 39 for retaining the sleeve against longitudinal movement. Shoulder washer 85 surrounds an outer end portion of head stock sleeve 39 and is interposed between cover 59 and head stock 41.

Axially nested within head stock sleeve 39 upon the first longitudinal axis 29 is the elongated core cutter tube or blade 87 having a sharp cutting annular edge 89 at one end. The outer end portion of core cutter tube 89 is guidably positioned through the seal or spacer 91, FIG. 3.

Nut 93 is secured upon the interior of core cutting tube 87 at one end thereof and has a pair of opposed lateral keys 95 which are slidably positioned within corresponding opposed longitudinal keyways 97 upon the interior of sleeve 39. Coring blade 87 is located and secured by a locking slot in the blade, receiving a dowel on threaded nut 93. Power rotation of sleeve 39 will effect corresponding rotation of nut 93 and the connected core cutting tube 87.

A screw means is provided interposed between sleeve 39 and core cutting tube 87. In the illustrative embodiment said screw means includes the nut 93 and upon the interior thereof and receiving said nut is an elongated feed screw 99 which has a continuous thread over which nut 93 is mounted. Screw 99 includes a shank 103 which extends through mount plate 105. Said mount plate is retained in position upon end plate 31 of framework 14 by dowel 107 and fasteners 113, FIG. 4.

Adjusting handle 109 has a shank 111 of reduced dimension which is axially threaded into one end of feed screw 99 and secured thereto. Accordingly, in setting up the machine, by manual rotation of adjusting screw handle 109, there may be an initial longitudinal adjustment of the elongated nut 93 upon the core cutting tube 87 for regulating and positioning the cutting end 89 relative to an outer end portion of head stock 41.

Figure 1:
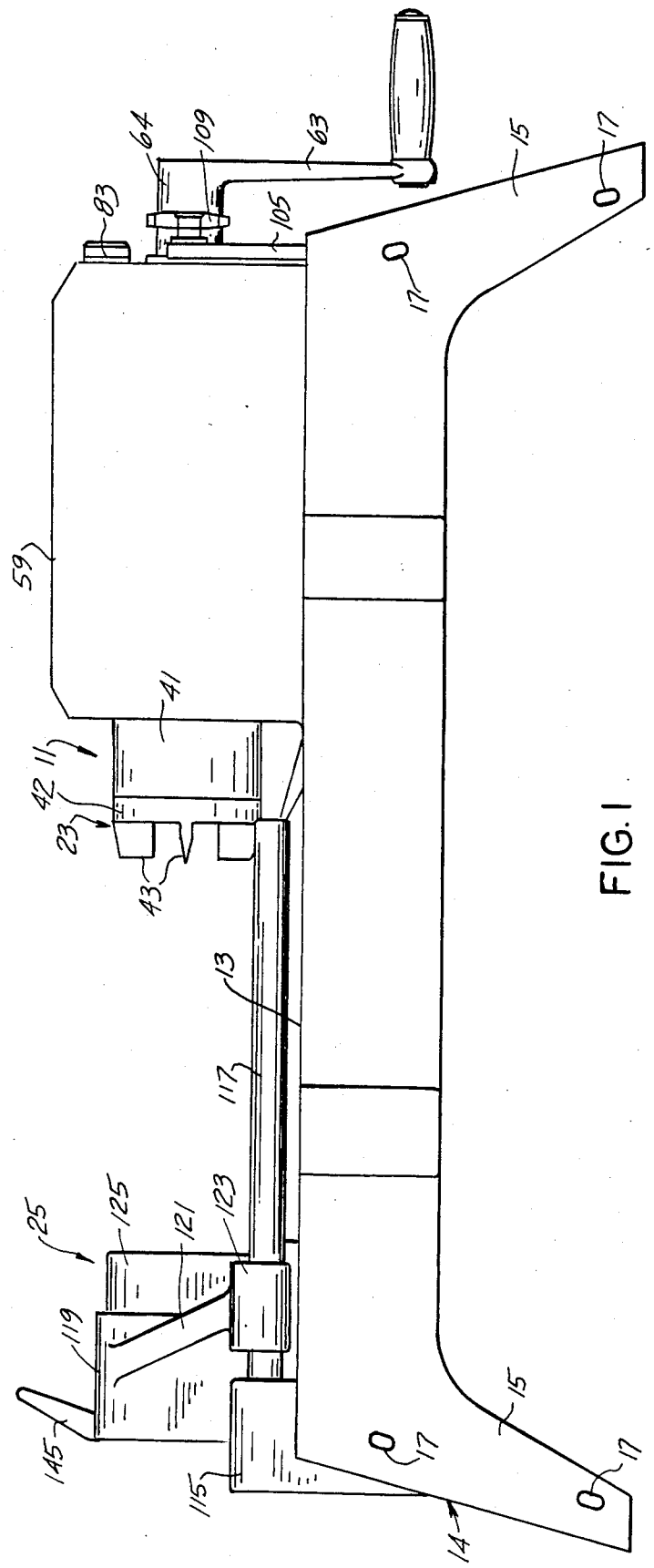
FIG. 1 is a side elevational view of the present pineapple corer and peeler with the legs omitted.
Figure 2:
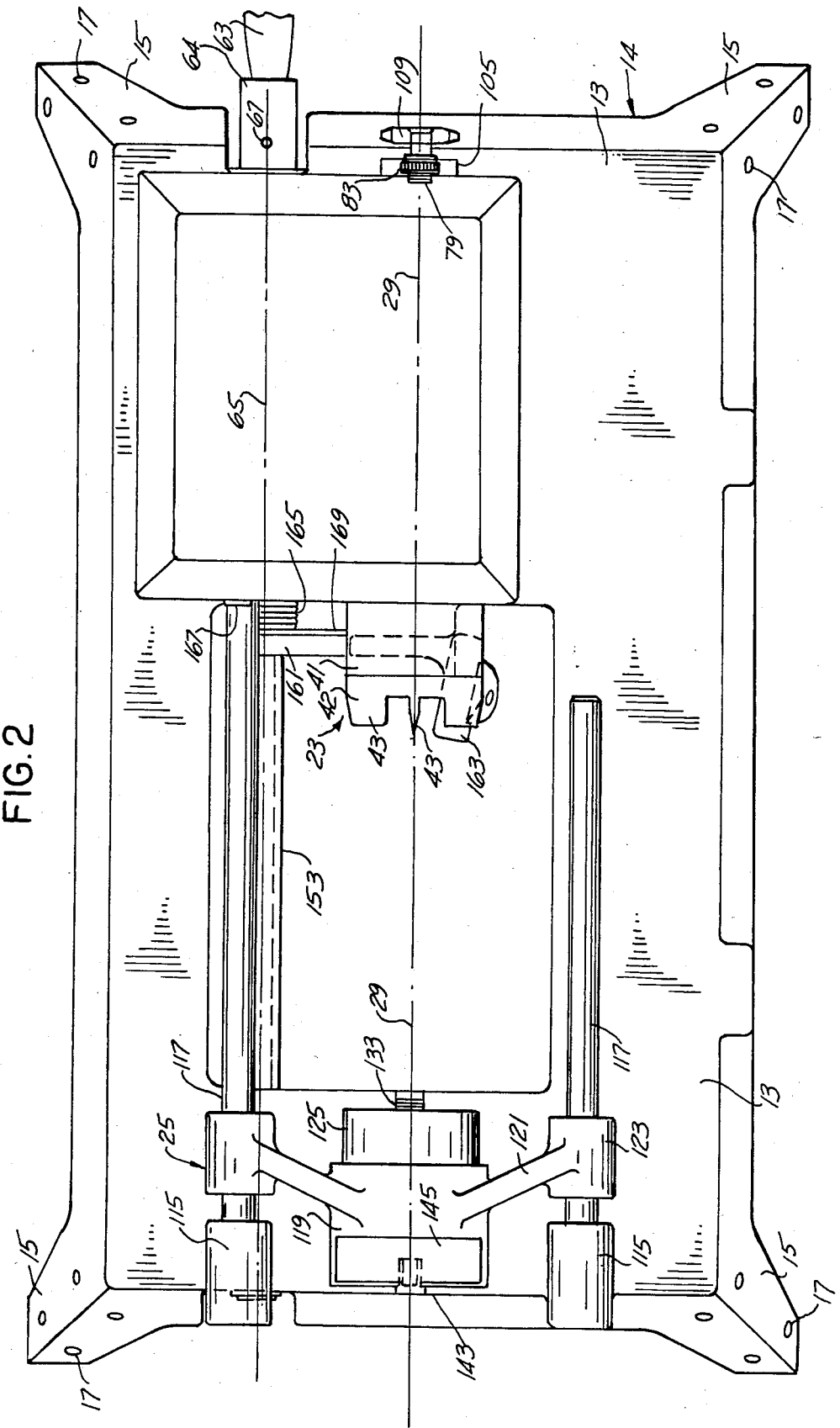
FIG. 2 is a plan view thereof.

As shown in FIG. 2 a pair of laterally spaced apertured bosses 115 are mounted upon framework 14, are secured to platform 13 and are arranged equidistant from the first longitudinal axis 29. A pair of laterally spaced parallel guide rods 117 at their one ends are projected into the corresponding bosses 115 and secured therein.

The tail stock assembly 25 includes tail stock 119 which has a pair of angularly inclined laterally directed support arms 121 with apertured mount bosses 123 which are slidably positioned over guide rods 117 to provide a slide mount for tail stock 119.

Said tail stock has an axial bore 127 in alignment with first axis 29 which receives and journals the tail stock grip 125 whose stop shoulder 129 bears against tail stock 119. Tail stock grip 125 is retained for rotation within tail stock 119 by snap rings 131, FIG. 3.

The tail stock grip is generally concave and is adapted to axially and longitudinally grip an end face 27 of pineapple P supporting and journaling the end of the pineapple for rotation about axis 29 under control of the power rotated head stock assembly 23.

The tail stock assembly 25 is adapted for longitudinal adjustment along axis 29 with respect to the head stock assembly 23 to accommodate and support pineapples of different lengths, as shown in dash lines, FIG. 3.

There is employed a pawl and ratchet assembly by which the tail stock 119 may be longitudinally adjusted relative to platform 13 and retained in such adjusted position. For this purpose, there is provided a ratchet bar 133 upon ratchet support 135 which overlies platform 13 and includes a support plate 136 which is secured to framework 14. Pawl 137 or latch is pivotally mounted at 139 upon tail stock 119 in FIG. 3. Torsion spring 141 is mounted around pivot 139 and at one end anchored with respect to tail stock 119 and with its other end operatively engaging pawl 137 for biasing the pawl into an interlock assembly with ratchet 133.

From the relationship of the pawl and ratchet shown in FIG. 3 it appears that the tail stock 119 may be manually projected towards the head stock along axis 29 with the pawl riding over the transverse teeth of the ratchet to one of the dash line positions shown. The pawl or latch 137 is effective for retaining the tail stock 119 in longitudinally adjusted position and for supporting the corresponding end of the pineapple in compression relative to head stock blades 43.

Pawl release arm 143, in the illustrative embodiment, is substantially upright and is pivotally mounted at 144 upon a portion of tail stock 119 spaced from pivot 139 and includes a transverse handle 145. One end of arm 143 has a cam surface 147 adapted to operatively engage pawl 137 for pivoting the pawl to a dash line disengaged position relative to the ratchet in order to release the tail stock to permit its retraction for separating the pineapple therefrom.

Within a pair of longitudinally spaced bosses 149 upon the interior of framework 14, FIG. 3, there are positioned bushings 151 which received opposite ends of lead screw 153 retained thereon by corresponding snap rings 155.

Driven gear 157 is secured upon lead screw 153 and is in mesh with drive gear 49 shown in dashed lines in FIG. 3. Nut 159 is threaded upon lead screw 153 and has mounted thereon a laterally extending peeler blade arm 161 which extends transversely of the third axis 154 parallel to first axis 29. The cutter arm 161 is shown out of position in FIG. 3. Upon the end of said arm is mounted inclined guide foot 163 supporting cylindrical cutter blade 172, adapted to operatively engage an exterior surface portion of unpeeled pineapple P. When coring begins, the cutter arm 161 is at rest under the cutter arm guard 61, forming a part of housing 69.

Coil spring 165 is mounted snugly around nut 159 and one curved end 167 of the spring extends around guide rod 117 retaining the nut 59 against rotation. The nut however is free for advancing movement along the length of lead screw 153 upon rotation thereof under the control of gears 49 and 157. The opposite transverse end portion 169 of said spring operatively bears against arm 161 and normally biases blade 172 snugly against the outer surface of pineapple P. Upon rotation of the pineapple under the control of the rotative head stock 41 blade 172 operatively engages and peels the pineapple as the blade moves longitudinally over the length of the pineapple. Guide foot 163 is adapted to operatively engage a portion of the pineapple so as to adjustably limit the depth of cut of the blade 172.

OPERATION

In operation, rotation of shaft 51 clockwise effects corresponding rotation of gears 49, 47, rotates sleeve or spindle 39, core cutting tube 87 and corresponding nut 93. Said nut being in threaded engagement with feed screw 99, such rotation effects longitudinal feed movement of core cutting tube 87 so that its sharp cutting edge 89 axially penetrates and severs the core axially of the pineapple as it moves the length thereof on continual longitudinal rotation of head stock sleeve 39.

At the end of the forward stroke the cutting edge 89 of the tube 87 has advanced the length of the pineapple and severed the core therefrom. Rotation of shaft 51 counterclockwise will gradually retract the core cutting tube 87. However since the feed screw 99 terminates in the centering stop 101, as in FIG. 3, in registry with the core severed from the pineapple, such retracting movement of tube 87 relative to stop 101 leaves the core within the pineapple in operative engagement with feed screw 99.

At the same time such rotation of gear 49 in mesh with lead screw gear 157 so rotates the lead screw 153 as to cause a retracting movement of nut 159. Said nut is held against rotation so that the cylindrical blade 172 moves along the surface of the pineapple as it retracts, being spring biased thereinto by coil spring 165 with the blade 172 following the retraction of the core cutting tube 87.

By this construction with the cutting blade 172 adjacent the left end of the pineapple shown in FIG. 3, the core cutting tube 87 will also be in that position to centrally and axially support the pineapple during the peeling operation. Thus, the core cutting tube 87 and blade 172 will retract simultaneously until the blade 172 has been retracted for the full length of the pineapple at which time the core cutting tube 87 is in the retracted position shown in FIG. 3. At that time by activation of handle 145 on arm 143 the pawl 137 is disengaged from ratchet 133 and the tail stock 119 may be manually retracted, such as to the position shown in FIG. 3, to disengage the pineapple and permit its manual separation from the corer and peeler shown in detail in FIG. 3.

The pineapple peeler and corer is comprised of a one-piece cast aluminum housing 59 with integral stand 15. It has a tail stock 119 which supports the pineapple and secures it against the drive blades 43 at its other end. There are three rotating shafts, driven by gears in mesh, which provide rotation to the pineapple and to locomote the coring and cutter blades.

To mount the pineapple in the machine, the pineapple is held in the right hand against the end of the drive blades. The tail stock 119 is moved into position with the left hand against the hand lever 145. Using the tail stock, the pineapple must be advanced onto the drive blades, in order to provide positive drive to rotate the pineapple.

When the pineapple is mounted against the blades, the tail stock will automatically lock in place by the latch 137 sprung into the ratchet plate 133 and held by torsion spring 141. The tail stock is released, freeing the pineapple, by pulling the lever 145 away from the pineapple.

When the handle 63 is turned in a clockwise direction, it rotates gear 49, which is pressed on and keyed to shaft 51. Gear 49 turns spindle 39 counterclockwise.

Feed screw 99 is static. It is flattened and fits into a slot in lock plate 105. Lead screw 99 has a left hand thread, so when spindle 39 is rotating counterclockwise, threaded nut 93 turns with it, rotating about the lead screw and advancing toward the left (per FIG. 3), pushing core blade 87 into the pineapple. Because the drive blades are mounted directly to the spindle, the pineapple is also being rotated counterclockwise. Note that the cutter arm 161 is shown out of position. When the coring operation commences, the cutter arm is at rest under the cutter arm guard, which is a cast appendage on the main housing 59.

Gear 157 is in mesh with gear 49 simultaneously with gear 39. It is pressed on and keyed to drive screw 153, which has a right hand thread, so that when gear 49 is turned clockwise, turning the drive screw counterclockwise, the cutter arm moves to the left in unison with the core blade. When the coring begins, the core blade 87 advances until the threaded nut 93 bumps the shoulder 101 at the left end of the lead screw 99.

The cutter arm 161 is guided across the pineapple by a guide foot 163. The cylindrical cutter blade 172 is angled so that it will not take a cut in the direction of the coring operation, nor in the direction the pineapple is rotating. When the handle 63 is turned in a counter-clockwise direction, the direction of the spindle is reversed, turning the pineapple clockwise, the threaded nut moves toward the right, withdrawing the core blade, and the cutter arm moves to the right to begin peeling. The cutter guide foot now controls the depth of cut for the blade, and torsion spring 165 maintains the cutter arm and guide foot. As the blade 172 reaches the other end of the pineapple, and the peeling is complete, the cutter arm engages the cast cutter arm guard 61, which directs the blade down, away from the pineapple, and captivates it.

It is contemplated as equivalent that the pineapple peeler and corer may operate on a vertical axis. Platform 13 would be vertical and end supports 15 and legs 19 could be omitted. Frame 14 and stand 15 would be fixed upon a suitable support and the respective axes 29, 65 and 154 would be vertical. Pawl release arm 143 would be horizontal. The head-stock assembly would be spaced from the platform rather than above it, and ratchet 133 would be vertical. The operation is the same but with the head-stock assembly 23 facing downwardly.

Having described my invention reference should now be had to the following claims.

I claim:

1. A pineapple corer and peeler comprising:
   a framework having a platform;
   a power rotated head stock assembly journaled upon said framework above said platform upon a longitudinal first axis adapted to axially grip and rotatably support one end of a pineapple;
   a tail stock assembly aligned with and spaced from said head stock assembly mounted upon the framework longitudinally adjustable upon said axis and adapted to axially engage and rotatably journal the other end of a pineapple;
   a rotatable core cutting tube with a sharpened circular end mounted within said head stock assembly upon said first axis and connected thereto for rotation therewith; and
   threaded means disposed between said head stock assembly and core cutting tube for effecting longitudinal movement of the core cutting tube relative to said head stock assembly along said axis and along the length of the pineapple for severing the pineapple core therefrom.

2. In the pineapple corer and peeler of claim 1, said frame including depending outwardly inclined longitudinally apertured end supports of general right angular cross-section; and
   a plurality of similarly inclined legs of similar cross-section at their one ends nested within and secured to said end supports and projecting therefrom.

3. In the pineapple corer and peeler of claim 1, siad head stock assembly including an elongated head stock sleeve journaled upon said framework;
   a head stock upon one end of said sleeve having an axial bore;
   a pinion gear secured upon and adjacent the other end of said sleeve, adapted to be enmeshed with a power rotated drive gear;
   said core cutting tube extending along the length of said sleeve and connected thereto.

4. In the pineapple corer and peeler of claim 3, said threaded means including an axial feed screw within and extending the length of said sleeve and head stock upon said first axis and at one end adjustably connected to said framework; and
   a feed nut secured within one end of said core cutting tube, slidably mounted upon said sleeve and in mesh with said feed screw, whereby rotation of said head stock sleeve, core cutting tube and nut relative to said feed screw effects longitudinal feeding of the rotatable core cutting tube axially outward of said head stock.

5. In the pineapple corer and peeler of claim 4, the connection of said feed screw to said framework including an apertured mount plate secured upon said framework rotatably receiving one end of said feed screw; and
   a feed screw adjusting handle having a shank axially projected into and secured to said feed screw, whereby manual rotation of said handle effects an initial longitudinal adjustment of said feed screw relative to said nut for locating the cutting end of said core cutting tube relative to said head stock.

6. In the pineapple corer and peeler of claim 3, said head stock including a grip ring secured over the end of said head stock and including a plurality of right angularly related tapered grips adapted for interlocking projection into one end of a pineapple.

7. In the pineapple corer and peeler of claim 3, a cover overlying said head stock sleeve;
   a drive shaft journaled upon said cover upon a second axis parallel to said first axis, adapted for connection to a rotative drive means; and
   a drive gear secured upon said drive shaft and in mesh with said pinion gear;
   rotation of said drive shaft in one direction rotating said head stock sleeve, head stock and core cutting tube in one direction, said threaded means simultaneously feeding said core cutting tube longitudinally of the head stock;
   rotation of said drive shaft in the opposite direction rotating said head stock sleeve, head stock and core cutting tube in the opposite direction, said threaded means simultaneously retracting the core cutting tube to its initial position, the severed core engaging said threaded means and remaining within the pineapple.

8. In the pineapple corer and peeler of claim 4, a cover overlying said head stock sleeve;
   a drive shaft journaled upon said cover upon a second axis parallel to said first axis, adapted for connection to a rotative drive means;
   and a drive gear secured upon said drive shaft and in mesh with said pinion gear;
   rotation of said drive shaft in one direction rotating said head stock sleeve, head stock and core cutting tube in one direction, said threaded means simultaneously feeding the core cutting tube longitudinally of the head stock;
   rotation of said drive shaft in the opposite direction rotating said head stock sleeve, head stock and core cutting tube in the opposite direction, said threaded means simultaneously retracting the core cutting tube to its initial position, the severed core engaging said feed screw and remaining within the pineapple.

9. In the pineapple corer and peeler of claim 7, said rotative drive means being a hand crank.

10. In the pineapple corer and peeler of claim 7, said rotative drive means being the drive shaft of a reversible electric motor.

11. In the pineapple corer and peeler of claim 8, said rotative drive means being a hand crank.

12. In the pineapple corer and peeler of claim 8, said rotative drive means being the drive shaft of a reversible electric motor.

13. In the pineapple corer and peeler of claim 8, a power rotatable lead screw mounted and journaled upon said framework upon a third axis parallel to said first axis;
   a feed nut threaded over said lead screw;
   a cutter arm mounted upon said nut and extending transversely of said third axis;
   an inclined peeler blade mounted upon said arm adapted to operatively engage the surface of a pineapple rotatably mounted between said head stock and tail stock; and
   spring means mounted upon said feed nut, at one end slidably engageable with said framework retaining said nut against rotation;
   the other end of said spring means bearing against said cutting arm and biasing said blade against said pineapple;
   power rotation of said lead screw advancing said nut and peeler blade longitudinally and spirally peeling said pineapple.

14. In the pineapple corer and peeler of claim 13, said head stock assembly including an elongated head stock sleeve journaled upon said framework;
   a head stock upon one end of said sleeve having an axial bore;
   a pinion gear secured upon and adjacent the other end of said sleeve, adapted to be enmeshed with a power rotated drive gear;
   said core cutting tube extending along the length of said sleeve and connected thereto.

15. In the pineapple corer and peeler of claim 13, said threaded means including an axial feed screw within and extending the length of said sleeve and head stock upon said first axis and at one end adjustably connected to said framework; and
   a feed nut secured within one end of said core carrying tube slidably mounted upon said sleeve and in mesh with said feed screw, whereby rotation of said head stock sleeve, core cutting tube and nut relative to said feed screw effects longitudinal feeding of the rotatable core cutting tube axially outward of said head stock.

16. In the pineapple corer and peeler of claim 13, a driven gear secured upon said lead screw adapted to be enmeshed with a power rotated drive gear.

17. In the pineapple corer and peeler of claim 13, a cover overlying said head stock sleeve;
   a drive shaft journaled upon said cover upon a second axis parallel to said first axis adapted for connection to a rotatable drive means;
   a drive gear secured upon said drive shaft and in mesh with said pinion gear;
   rotation of said drive shaft in one direction rotating said head stock sleeve, head stock and core cutting tube in one direction, said threaded means simultaneously feeding the core cutting tube longitudinally of the head stock;
   rotation of said drive shaft in the opposite direction rotating said head stock sleeve, head stock and core cutting tube in the opposite direction, said threaded means simultaneously retracting the core cutting tube to its initial position, the severed core engaging said threaded means and remaining within the pineapple;
   a driven gear secured upon said lead screw;
   the drive gear upon said drive shaft being in mesh with the drive gear upon said lead screw and in mesh with the pinion gear on said head stock sleeve, whereby during rotation of said head stock sleeve and retraction of the core cutting tube there is a simultaneous traverse of the peeling blade along the length of the pineapple.

18. In the pineapple corer and peeler of claim 17, said drive gear upon said cover being in mesh with said pinion gear upon said head stock sleeve;
   said drive gear upon said cover being in mesh with the drive gear upon said lead screw for controlling retraction of said feed nut thereon and the connected peeler blade to traverse the length of said pineapple.

19. In the pineapple corer and peeler of claim 17, there being an annular groove around said head stock sleeve; and a radial lock tab glidably mounted upon said cover and at one end retainingly projected into said groove.

20. In the pineapple corer and peeler of claim 19, a friction screw means extending through said lock tab, and threaded upon said cover for clamping said latch plate in position.

21. In the pineapple corer and peeler of claim 17, said core cutting tube providing an axial support for the cored pineapple during peeling thereof, with retraction of said core cutting tube corresponding to retraction of said peeler blade along the length of said pineapple.

22. In the pineapple corer and peeler of claim 1, said tail stock assembly including a pair of laterally spaced apertured bosses at one end of said framework mounted upon said platform, upon opposite sides of said first axis;
  a pair of parallel guide rods at their one ends secured within said bosses and overlying said platform;
  a tail stock having a bore upon a longitudinal axis aligned with said first axis, slidably mounted upon said guide rods;
  a tail stock grip journaled within and mounted upon said tail stock adapted to compressively and axially engage and journal one end of a pineapple; and
  adjustable stop means interposed between said tail stock and framework for axially retaining said tail stock in operative engagement with a pineapple and for selectively supporting pineapples of different lengths.

23. In the pineapple corer and peeler of claim 22, the mounting of said tail stock including a pair of laterally diverging support arms upon the tail stock terminating an apertured guide bosses slidably positioned over said guide rods.

24. In the pineapple corer and peeler of claim 22, said adjustable stop means including interlocked and separable ratchet and a spring biased pawl.

25. In the pineapple corer and peeler of claim 22, an elongated ratchet overlying said platform in a plane passing through said first axis;
  a pawl pivotally mounted upon said tail stock and normally spring biased into interlocking engagement with said ratchet.

26. In the pineapple corer and peeler of claim 25, and a pawl release arm pivotally mounted upon said tail stock and having a cam surface adapted on pivotal movement of said arm to operatively engage and rotate said pawl disengaging it from said ratchet, said pawl, on release of said arm being biased into interlocking registry with said ratchet.

27. In the pineapple corer and peeler of claim 22, a power rotatable lead screw mounted and journaled upon said framework upon a third axis parallel to said first axis;
  a feed nut threaded over said lead screw;
  a cutter arm mounted upon said nut and extending transversely of said third axis;
  an incline peeler blade mounted upon said arm adapted to operatively engage a surface of a pineapple rotatably mounted between said head stock and tail stock; and
  spring means mounted upon said feed nut, at one end slidably engageable with one of said guide rods retaining said nut against rotation;
  the other end of said spring means bearing against said cutting arm and biasing said blade against said pineapple;
  power rotation of said lead screw advancing said nut and peeler blade longitudinally and spirally peeling said pineapple.

28. In the pineapple corer and peeler of claim 13, and an adjustable stop means upon said peeler blade registerable with an unpeeled portion of said pineapple for regulating the depth of cut of said peeler blade.

* * * * *